(12) United States Patent
Adachi et al.

(10) Patent No.: US 10,026,034 B2
(45) Date of Patent: Jul. 17, 2018

(54) SLIDE STRUCTURE AND ELECTRONIC DEVICE

(71) Applicant: Kabushiki Kaisha Toshiba, Minato-ku (JP)

(72) Inventors: Kosuke Adachi, Yokohama (JP); Shiro Harashima, Sagamihara (JP); Shanying Pan, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/450,331

(22) Filed: Mar. 6, 2017

(65) Prior Publication Data

US 2017/0271804 A1 Sep. 21, 2017

(30) Foreign Application Priority Data

Mar. 16, 2016 (JP) ................................ 2016-052130

(51) Int. Cl.
| | | |
|---|---|---|
| H01R 13/44 | (2006.01) | |
| H01R 13/60 | (2006.01) | |
| G06K 19/077 | (2006.01) | |
| G06K 19/00 | (2006.01) | |

(52) U.S. Cl.
CPC ....... *G06K 19/07732* (2013.01); *G06K 19/00* (2013.01)

(58) Field of Classification Search
CPC ... H01R 13/44; H01R 13/4538; H01R 13/665
USPC ........................................................ 439/131
See application file for complete search history.

(56) References Cited

U.S. PATENT DOCUMENTS

| | | | | |
|---|---|---|---|---|
| 6,979,210 | B2* | 12/2005 | Regen | .................. H01R 13/629 439/131 |
| 7,303,411 | B1* | 12/2007 | Morganstern | ........ H01R 13/447 439/131 |
| 7,361,032 | B2* | 4/2008 | Loftus | ................ H01R 13/4538 439/131 |
| 7,661,967 | B2* | 2/2010 | Tang | .................. H01R 13/6658 439/131 |

(Continued)

FOREIGN PATENT DOCUMENTS

| | | |
|---|---|---|
| JP | S57-076381 U1 | 10/1982 |
| JP | S63-186070 U1 | 11/1988 |

(Continued)

*Primary Examiner* — Hae Moon Hyeon
(74) *Attorney, Agent, or Firm* — Oblon, McClelland, Maier & Neustadt, L.L.P.

(57) ABSTRACT

A slide structure comprises first and second members, a slider, a guide, and a first elastic part. The second member is movably supported by the first member. The slider is provided in one of the first member and the second member. The guide is provided in the other of the first member and the second member. The guide movably supports the slider among a first holding position, a slide section, and a second holding position. The first holding position is away or offset from a first position in a first direction. The slide section extends between the first position and a second position. The second position is distant from the first position in a second direction intersecting with the first direction. The second holding position is away or offset from the second position in the first direction.

9 Claims, 12 Drawing Sheets

(56) References Cited

U.S. PATENT DOCUMENTS

| | | | |
|---|---|---|---|
| 8,102,662 B2* | 1/2012 | Hiew | H05K 5/0278 |
| | | | 361/752 |
| 8,622,757 B2* | 1/2014 | Hsu | H05K 5/0278 |
| | | | 439/131 |
| 9,478,891 B2* | 10/2016 | Kuo | G06K 19/07732 |
| 2007/0127219 A1 | 6/2007 | Ho et al. | |
| 2010/0321878 A1 | 12/2010 | Huang | |
| 2013/0023135 A1 | 1/2013 | Nakamura et al. | |
| 2014/0242849 A1 | 8/2014 | Yamaguchi et al. | |

FOREIGN PATENT DOCUMENTS

| | | |
|---|---|---|
| JP | H05-046003 U | 6/1993 |
| JP | H09-181466 A | 7/1997 |
| JP | 2000-123912 A | 4/2000 |
| JP | 3124842 U | 8/2006 |
| JP | 2008-311314 A | 12/2008 |
| JP | 2013-26049 A | 2/2013 |
| TW | 201434218 A | 9/2014 |

\* cited by examiner

SLIDE STRUCTURE AND ELECTRONIC DEVICE

CROSS-REFERENCE TO RELATED APPLICATIONS

This application is based upon and claims the benefit of priority from Japanese Patent Application No. 2016-052130, filed Mar. 16, 2016, the entire contents of which are incorporated herein by reference.

FIELD

Embodiments described herein relate generally to a slide structure and an electronic device.

BACKGROUND

Conventionally, electronic devices into which and out of which a connector is slidable are known.

For example, it is useful to attain a slide structure or an electronic device having a novel configuration with less inconvenience, such as one made of a smaller number of components.

DETAILED DESCRIPTION

Figure 1:
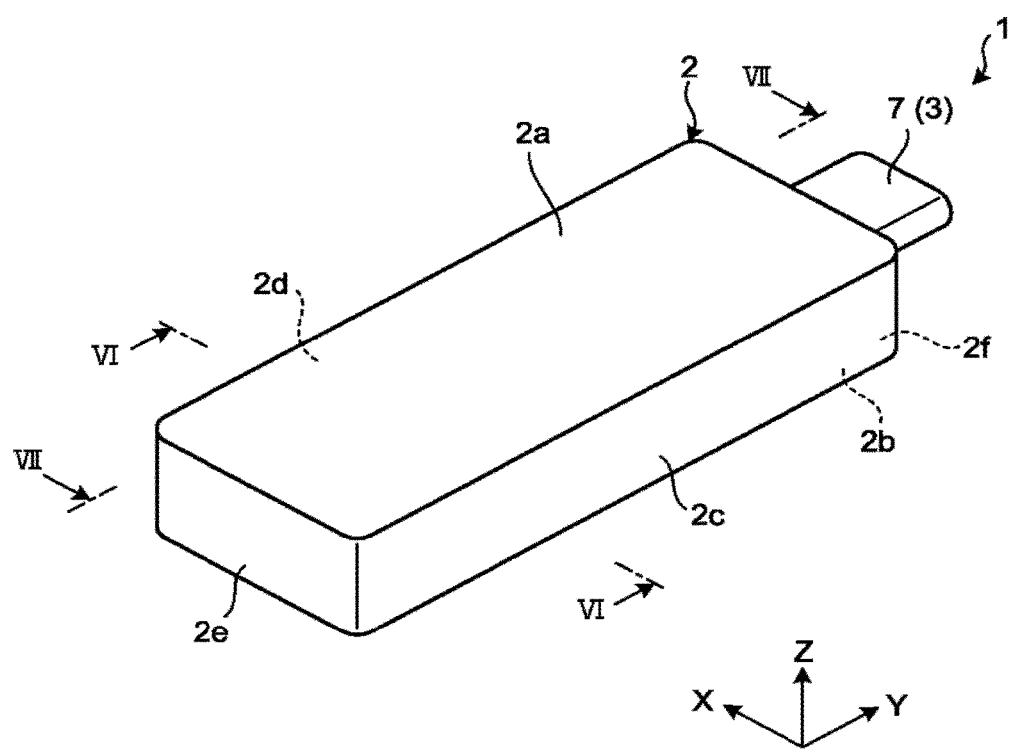
FIG. 1 is a schematic and exemplary perspective view of an electronic device in use according to the first embodiment.

In general, according to one embodiment, a slide structure includes a first member, a second member, a slider, a guide, and a first elastic part. The second member is movably supported by the first member. The slider is provided in one of the first member and the second member. The guide is provided in the other of the first member and the second member. The guide movably supports the slider among a first holding position, a slide section, and a second holding position. The first holding position is away or offset from a first position in a first direction. The slide section extends between the first position and a second position. The second position is distant from the first position in a second direction intersecting with the first direction. The second holding position is positioned away or offset from the second position in the first direction. The first elastic part is a part of the second member. The first elastic part elastically deforms in accordance with a position of the second member relative to the first member to be able to urge the slider in the first direction.

Hereinafter, exemplary embodiments of an electronic device and a slide structure will be disclosed. Configurations and control (technical features), and functions and results (effects) brought by the configurations and control, of the embodiments described below are merely examples. In the drawings, an X direction, a Y direction, a rid a direction are defined for the sake of simple description. The X direction, the Y direction, and the Z direction are perpendicular to one another. Hereinafter, in the drawings an opposite direction to the arrow of the X direction is referred to as opposite X direction, an opposite direction to the arrow of the Y direction is referred to as an opposite Y direction, and an opposite direction to the arrow of the Z direction is referred to as an opposite Z direction.

The following embodiments include same or like constituent elements. Hereinafter, those same or like constituent elements are denoted with common reference signs, and overlapping description thereof may be omitted.

First Embodiment

Figure 2:
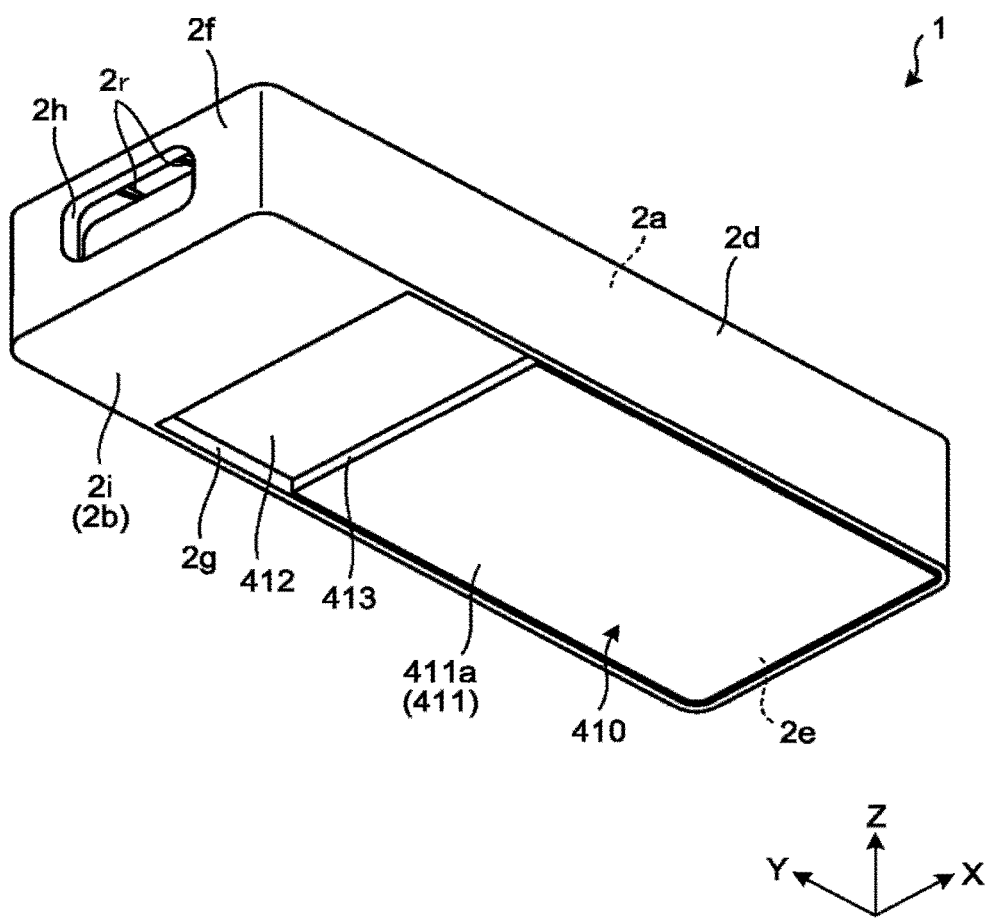
FIG. 2 is a schematic and exemplary perspective view of the electronic device in non-use (housed) in the first embodiment.
Figure 3:
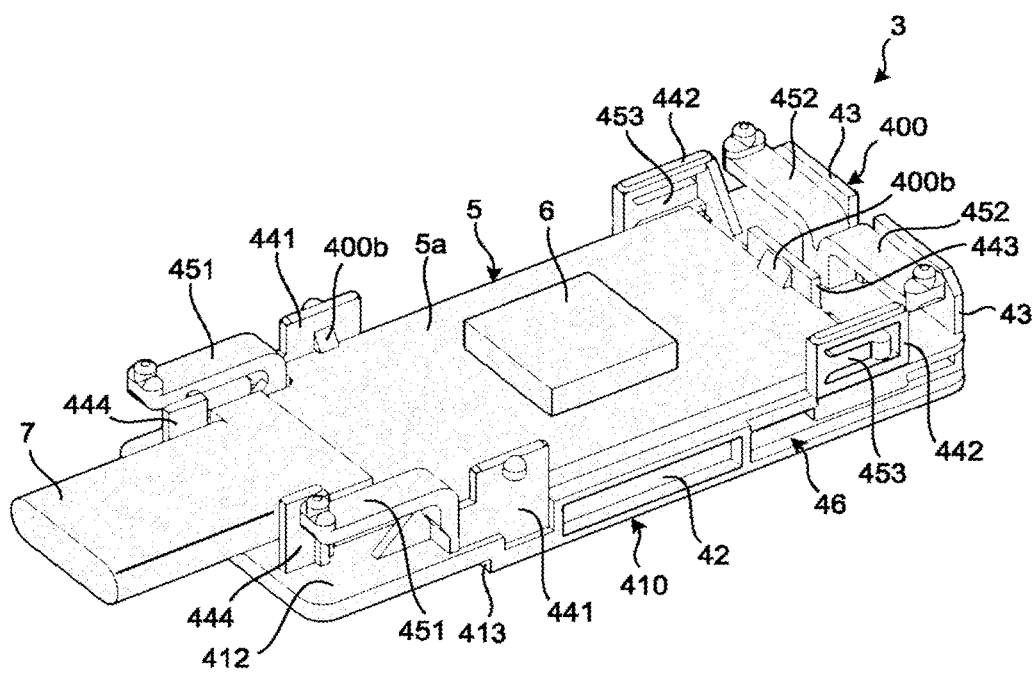
FIG. 3 is a schematic and exemplary perspective view of a movable assembly accommodated in the electronic device in the first embodiment.

FIG. 1 is a perspective view of a universal serial bus (USB) memory 1 in a use state, FIG. 2 is a perspective view of the USB memory 1 in a non-use state, and FIG. 3 is a perspective view of a movable assembly 3 accommodated inside the USB memory 1. The USB memory 1 is an example of an electronic device and a slide structure. The USB memory 1 may be referred to as storage device or semiconductor storage device, for example.

As illustrated in FIGS. 1 to 3, the USB memory 1 includes a case 2 and the movable assembly 3. The movable assembly 3 includes a base unit 400. The base unit 400 supports a circuit board 5. An electronic component 6 and a connector 7 are fixed to the circuit board 5. The case 2 and the base unit 400 are plane symmetric with respect to a face passing the center in the X direction and extending in the Y direction and the Z direction. The case 2 is an example of a housing and a first member. The movable assembly 3 is an example of a movable member, and may be referred to as an internal structure. The base unit 400 is an example of the movable member and a second member. The base unit 400, the circuit board 5, the electronic component 6, and the connector 7 may be referred to as components. The connecter 7 is, but not limited to, a USB connector such as a type C connector.

The movable assembly 3 is movably supported in the case 2. The movable assembly 3 is movable between a protruding position (FIG. 1) in which the connector 7 protrudes from the case 2, and a housed position (FIG. 2) in which the connector 7 is housed in the case 2. The non-use state may be referred to as housed state.

As illustrated in FIGS. 1 and 2, the external shape of the case 2 is flat, rectangular parallelepiped, and is long in the Y direction and thin in the Z direction. The case 2 includes six rectangular walls 2a to 2f. The walls 2a and 2b are parallel to each other and spaced apart in the Z direction. The walls 2a and 2b have a rectangular shape extending in the X direction and the Y direction. The walls 2c and 2d are parallel to each other and spaced apart in the X direction. The walls 2c and 2d have a square shape extending in the Y direction and the Z direction. The walls 2e and 2f are parallel to each other and spaced apart in the Y direction. The walls 2e and 2f extend in the X direction and the Z direction. The case 2 has a space surrounded by the walls 2a to 2f. The case 2 is, for example, a molded item made of synthetic resin material (plastic or engineering plastic).

The wall 2b is provided with a long opening 2g. In other words, the wall 2b is distant from the wall 2e and contacts with the wall 2f, and the opening 2g is provided between the wall 2b and the wall 2e. The space in the case 2 is open in an opposite direction through the opening 2g. The wall 2b is an example of a third wall.

The wall 2f is provided with a long opening 2h. The space in the case 2 is open in the Y direction through the opening 2h. As illustrated in FIG. 1, the connector 7 can protrude through the opening 2h.

Figure 4:
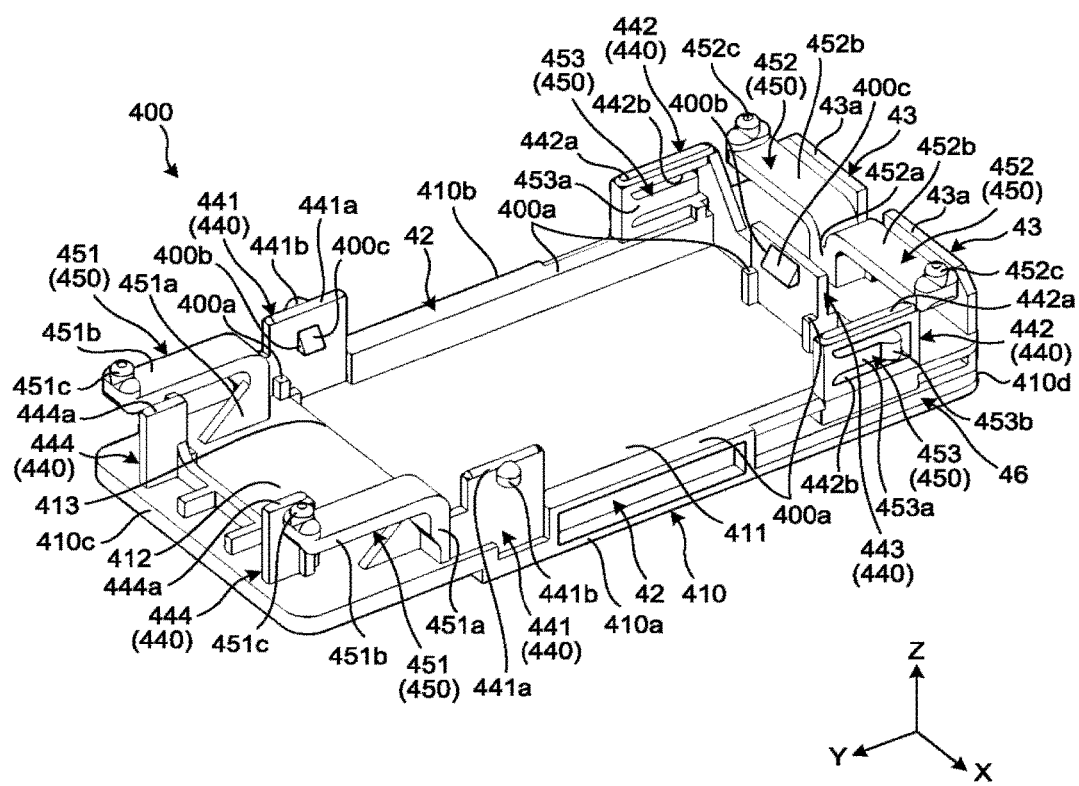
FIG. 4 is a schematic and exemplary perspective view of a base unit included in the movable assembly accommodated in the electronic device in the first embodiment.
Figure 5:
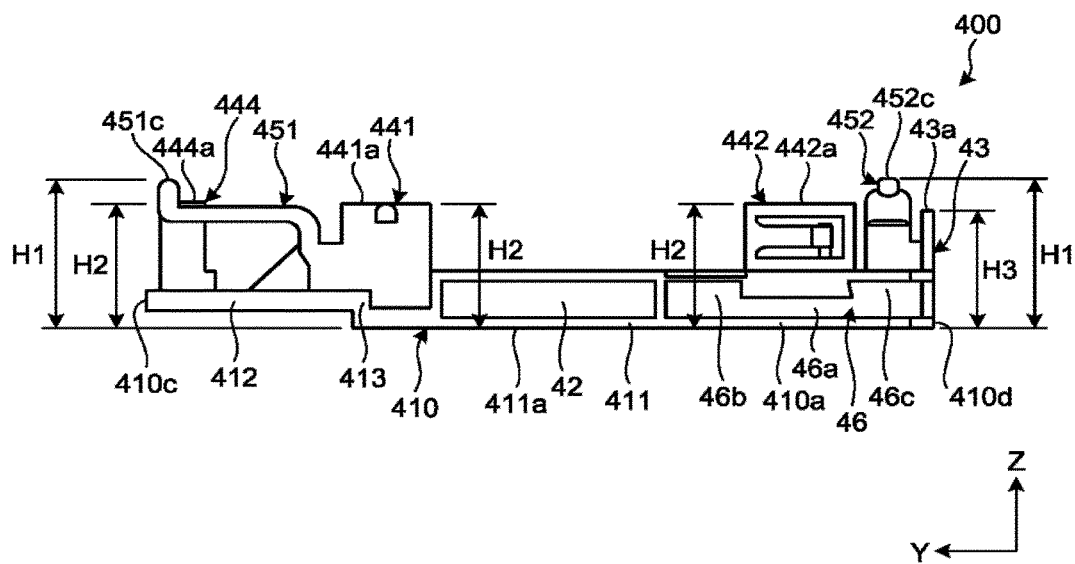
FIG. 5 is a schematic and exemplary side view of the base unit included in the movable assembly accommodated in the electronic device in the first embodiment.

FIG. 4 is a perspective view of the base unit 400. FIG. 5 is a side view of the base unit 400. The base unit 400 includes a bottom wall 410, side walls 42, an end wall 43, a protruding wall 440, and an elastic part 450. The base unit 400 is, for example, a molded item made of synthetic resin material (plastic or engineering plastic). That is, the bottom wall 410, the side walls 42, the end wall 43, the protruding wall 440, and the elastic part 450 are integrated together and form a part of the base unit 400 as one resin molded item.

The bottom wall 410 has a rectangular plate shape extending in the X direction and the Y direction. The bottom wall 410 includes an end 410a and an opposite end 410b in the X direction, and an end 410c and an opposite end 410d in the Y direction. The ends 410a and 410b are also referred to as ides, and extend in the Y direction. The ends 410c and 410d are also referred to as sides, and extend in the X direction. The bottom wall 410 is an example of a first wall.

The bottom wall 410 has a stepwise form. The bottom wall 410 includes a first part 411 and a second part 412. The second part 412 contacts with the first part 411 in the Y direction and is offset therefrom in the Z direction. A step 413 is provided between the first part 411 and the second part 412, extending in the X direction. In the housed state of FIG. 2, the first part 411 is accommodated in the opening 2g of the case 2. The bottom wall 410 blocks the opening 2g. In the use state, a bottom face 411a is exposed through the opening 2g of the first part 411 and continues into a face 2i of the wall 2b of the case 2 in the Y direction with almost no offset in the Z direction. In the use state, the bottom wall 410 extends along the wall 2b, with the second part 412 overlapping the wall 2b in the Z direction and supported by the wall 2b. In other words, the first part 411 is a protrusion from the bottom wall 410 in the opposite Z direction. Note that the bottom wall 410 may not have a stepwise form.

The side walls 42 protrude from the ends 410a and 410b of the bottom wall 410 in the Z direction. The side walls 42 have an approximately constant height in the Z direction and extend in the Z direction. The two side walls 42 are parallel to each other. The end wall 43 protrudes from the end 410d of the bottom wall 410 in the Z-direction. The end wall 43 has an approximately constant height in the Z direction and extends in the X direction. A Z-directional end 43a of the end wall 43 extends in the X direction.

The protruding wall 440 includes first protruding walls 441, second protruding walls 442, a third protruding wall 443, and fourth protruding walls 444. The protruding wall 440 may be referred to as wall or support.

The first protruding walls 441 and the second protruding walls 442 protrude from the two side walls 42 in the Z direction. The first protruding walls 441 are provided in distant positions from the center of the bottom wall 410 in the Y direction, and the second protruding walls 442 are provided in distant positions from the center in the opposite Y direction. That is, the first protruding walls 441 and the second protruding walls 442 protrude from two distant locations of the side walls 42 in the Y direction. The first protruding walls 441 extend in the Y direction and in the Z direction. The two first protruding walls 441 are aligned with a spacing in the X direction in parallel to each other. The second protruding walls 442 extend in the Y direction and in the Z direction. The two second protruding walls 442 are aligned with a spacing in the X direction in parallel to each other. Z-directional ends 441a of the first protruding walls 441 and Z-directional ends 442a of the second protruding walls 442 extend in the Y direction.

The third protruding wall 443 is positioned between the two second protruding walls 442. The third protruding wall 443 extends in the X direction and in the Z direction. The first protruding walls 441 extend over the first part 411 and the second part 412 across the step 413 of the bottom wall 410 in the Y direction. That is, the first protruding walls 441 function to reinforce the bottom wall 410 in the step 413.

The fourth protruding walls 444 protrude from the second part 412, and extend in the Y direction and in the Z direction. The two fourth protruding walls 444 are aligned with a spacing in the X direction in parallel to each other. One of the fourth protruding walls 444 is provided closer to the end 410a than to the end 410b of the bottom wall 410, and the other of the fourth protruding walls 444 is provided closer to the end 410b than to the end 410a of the bottom wall 410.

The elastic part 450 includes elastic parts 451, 452, and 453. The elastic parts 451 are provided in the second part 412 of the bottom wall 410, contacting with the first protruding walls 441 in the Y direction. The two elastic parts 451 are aligned with a spacing in the X direction. The elastic parts 451 each include a vertical wall 451a, an arm 451b, and a contact 451c. The vertical wall 451a is integrated with the first protruding wall 441, has a constant width in the X direction, and extends in a belt-like manner in the Z direction. The arm 451b has a constant width in the X direction and extends in the Y direction from a tip end of the vertical wall 451a. The vertical wall 451a and the arm 451b are connected through a curved part. The contact 451c protrudes in an inverted T-shape from a tip end of the arm 451b in the Z direction. The tip end of the arm 451b and the contact 451c are adjacent to the fourth protruding wall 444 with a gap in the X direction or in an opposite X direction. That is, as viewed from the Z direction, the arm 451b, which is positioned closer to the end 410a than to the end 410b, is positioned closer to the end 410a than the fourth protruding wall 444, which is positioned closer to the end 410a than to the end 410b. Further, the arm 451b, which is positioned-loser to the end 410b than to the end 410a, is positioned closer to the end 410b than the fourth protruding wall 444, which is positioned closer to the end 410b than to the end 410a. The tip end of the contact 451c has, for example, a columnar shape with a rounded periphery. The contact 451c has an inverted T-shape and is narrower than the arm 451b, and thus its sliding resistance against the wall 2a of the case 2 can be reduced. The elastic part 451 is an example of a first elastic part. The arm 451b is an example of an extension.

The elastic parts 452 are provided in the first part 411 of the bottom wall 410 between the end wall 43 and the third protruding wall 443. The two elastic parts 452 are aligned with a spacing in the X direction. The elastic parts 452 each include a vertical wall 452a, an arm 452b, and a contact 452c. The vertical wall 452a has a constant width in the Y direction and extends in a belt-like manner in the Z direction from about the center of the first part 411 in the X direction. The arm 452b has a constant width in the Y direction and extends in a belt-like manner in the X direction from a tip end of the vertical wall 452a. The arms 152b of the two elastic parts 452 extend in opposite directions. The vertical wall 452a and the arm 452b are connected through a curved part. The contact 452c protrudes in an inverted T-shape in the Z direction from a tip end of the arm 452b. The tip end of the contact 452c has, for example, a columnar shape with a rounded periphery. The contact 452c has an inverted T-shape and is narrower than the arm 452b, and its sliding resistance against the wall 2a of the case 2 can be thus reduced. The elastic parts 452 may include the two vertical walls 452a, and the arms 452b may extend from the respective two vertical walls 452a. The elastic parts 452 are an example of the first elastic part. The arms 452b are an example of the extension.

The contacts 451c and 452c of the elastic parts 451 and 452 can contact with an inner face of the wall 2a of the case 2 while the movable assembly 3 is accommodated in the case 2. The arms 451b and 452b of the elastic parts 451 and 452 extend in a belt-like manner in a direction intersecting with the Z direction, and thus can be elastically deformed according to displacement of the contacts 451c and 452c in the Z direction in the base unit 400. Because of this, the elastic parts 451 and 452 can function as plate springs, and can apply elastic repulsive force to the wall 2a of the case 2 in the Z direction and urge the base unit 400 in the opposite Z direction in accordance with the elastic deformation of the arms 451b and 452b according to the displacement the base unit 400 relative to the case 2 in the Z direction, that is, the elastic deformation of the arms 451b and 452b according to the displacement of the contacts 451c and 452c in the Z direction in the base unit 400. Further, the elastic parts 451 and 452 include the arms 451b and 452b (and the vertical walls 451a and 452a) and can have a relatively long length from the bottom wall 410, so that the bottom wall 410 is less affected by the stress from the elastic deformation of the elastic parts 451 and 452.

The vertical walls 451a and 452a protrude from the bottom wall 410 in the Z direction between the bottom wall 410 and the arms 451b and 452b. With such a configuration, the arms 451b and 452b can extend along the inner face of the wall 2a closer to the wall 2a than to the wall 2b of the case 2. That is, as will be clear from FIG. 5, the arms 451b and 452b are positioned at both ends of the movable assembly 3 and the base unit 400 in the Z direction. Thus, in the movable assembly 3 and the unit 400, the distance between the arms 451b and 452b and the opposite ends (for example, the bottom wall 410) in the Z direction can be elongated. Further, the two arms 451b are positioned at both ends of the movable assembly 3 and the base unit 400 in the X direction as viewed from the Z direction. Thus, in the movable assembly 3 and the base unit 400, the distance between one arm 451b and the opposite end (for example, the other arm 451b) in the X direction can be elongated. Further, the two arms 452b are positioned at the opposite ends of the movable assembly 3 and the base unit 400 in the Y direction as viewed from the Z direction. Thus, in the movable assembly 3 and the base unit 400, the distance between the arm 452b and the opposite end (for example, the end 410d of the bottom wall 410) can be elongated. This can increase the degree of freedom of sizes and layouts of components of the circuit board 5 and the electronic component 6 between the arms 451b and 452b, and their opposite ends. The wall 2a is an example of a second wall.

The contacts 451c and 452c are positioned at both X-directional ends, both Y-directional ends, or in the corners of the movable assembly 3 and the base unit 400 as viewed from the Z direction. This can further stabilize the posture of the movable assembly 3 than when the contacts 451c and 452c are provided distantly from the ends.

The second protruding walls 442 are each provided with an opening 442b. The elastic parts 453 each protrude from one end to the other end of the opening 442b. The elastic part 453 includes an arm 453a and a contact 453b. The arm 453a has a constant width in the Z direction and extends in a belt-like manner in the opposite Y direction from a Y-directional end of the opening 442b. The contact 453b protrudes from a tip end of the arm 453a to be away from the center of the bottom wall 410 in the X direction. The contacts 453b of the two elastic parts 453 protrude in opposite directions. The shape of tip ends of the contacts 453b is, for example, columnar.

The contacts 453b of the elastic parts 453 can contact with the inner faces of the walls 2c and 2d of the case 2 while the movable assembly 3 is accommodated in the case (see FIGS. 1 and 2). Since the arms 453a extend in a belt-like manner, intersecting with the X direction, the arms 453a are elastically easily deformable according to displacement of the contacts 453b in the X direction in the base unit 400. Thus, the elastic parts 453 can function as plate springs, and can apply elastic repulsive force to the walls 2c and 2d of the case 2 in the X direction or in the opposite X direction and urge the base unit 400 in the opposite X direction or the X direction in accordance with the elastic deformation of the arms 451b, 452b according to the displacement of the base unit 400 relative to the case 2 in the X direction, or the elastic deformation of the arms 453a according to the displacement of the contacts 453b in the X direction in the base unit 400. With such a configuration, for example, the movable assembly 3 can be prevented from moving in the X direction in the case 2 and generating noise or vibration and be improved in terms of shock resistance. The elastic parts 453 are an example of a second elastic part.

The arms 453a extend along the inner faces of the walls 2c and 2d of the case 2, intersecting with the X direction (see FIGS. 1 and 2). That is, the two arms 453a are positioned on both X-directional ends 410a and 410b of the movable assembly 3 and the base unit 400 as viewed from the Z direction. Thus, in the movable assembly 3 and the base unit 400, the distance between each arm 453a and the opposite end ((for example, the second protruding wall 442) in the X direction can be elongated. This can increase the degree of freedom of sizes and layouts of the components of the circuit board 5 and the electronic component 6 between the arms 453a and their opposite ends.

As will be clear from FIG. 4, the first protruding walls 441 include, at tip ends, protrusions 441*b* protruding to be away from the center of the bottom wall 410 in the X direction. The protrusions 441*b* of the two first protruding walls 441 protrude in opposite directions. The protrusions 441*b* can contact with the inner faces of the walls 2*c* and 2*d* of the case 2 while the movable assembly 3 is accommodated in the case 2 (see FIGS. 1 and 2).

As will be clear from FIG. 5, the base unit 400 includes ends 441*a*, 442*a*, and 444*a* with a height H2 lower than a height H1 from the bottom face 411*a* to the tip ends of the contacts 451*c* and 452*c*. The ends 441*a*, 442*a*, and 444*a* face the wall 2*a* of the case 2 in the Z direction. When the base unit 430 is moved in the Z direction or approaches the wall 2*a* of the case 2, the ends 441*a*, 442*a*, and 444*a* come in contact with an inner face 2*a*1 (see FIGS. 8 and 9) of the wall 2*a* of the case 2. With such a configuration, the elastic parts 451 and 452 (the arms 451*b* and 452*b*) are prevented from being excessively deformed. The first protruding walls 441 including the ends 441*a*, the second protruding walls 442 including the ends 442*a*, and the fourth protruding walls 444 including the ends 444*a* are examples of a protrusion. The first protruding walls 441, the second protruding walls 442, and the fourth protruding walls 444 may also be referred to as slidable supports.

As illustrated in FIG. 5, a height H3 of the end wall 43 from the bottom face 411*a* is lower than the height H2 of the first protruding wall 441, the second protruding wall 442, and the fourth protruding wall 444. This prevents interference between the end wall 43 and the case 2 at the time of inserting the movable assembly 3 into the case 2 through the opening 2*g*, making it easier for the movable assembly 3 to enter into the case 2.

As illustrated in FIG. 4, the base unit 400 includes support faces 400*a* and claws 400*b* for the circuit board 5. The support faces 400*a* are provided on the side walls 42 and the third protruding wall 443, facing in the Z direction. The claws 400*b* are provided on the first protruding walls 441 and the third protruding wall 443. A gap between the support faces 400*a* and the claws 400*b* in the Z direction is set to be approximately the same as or slightly larger than the thickness of the circuit board 5. The circuit board 5 is sandwiched between the support faces 400*a* and the claws 400*b* along the thickness. As illustrated in FIG. 3, the first protruding walls 441 are positioned out of the circuit board 5 in the X direction or in the opposite X direction from the circuit board 5. The claws 400*b* of the first protruding walls 441 protrude from the first protruding walls 441 oppositely toward the center of the circuit board 5 in the X direction. The third protruding wall 443 is positioned out of the circuit board 5 in the opposite Y direction. The claw 400*b* of the third protruding wall 443 protrudes from the third protruding wall 443 toward the center of the circuit board 5 in the Y direction. Further, the claws 400*b* each include an inclined face 400*c* inclined oppositely to the protruding direction of the claw 400*b* as going distant in the Z direction or away from the circuit board 5 in the thickness direction. With such a configuration, when the inclined faces 400*c* are pressed by the circuit board 5 moving in the opposite Z direction, the first protruding walls 441 and the third protruding wall 443 are elastically deformed to cause the claws 400*b* to recede, that is, to move away from the circuit board 5 in the intersecting direction with the Z direction. When the circuit board 5 further moves in the opposite Z direction and surmounts the claws 400*b*, the first protruding walls 441 and the third protruding wall 443 return to the original shapes. In this state, the circuit board 5 is sandwiched between the support faces 400*a* and the claws 400*b*. That is, the first protruding walls 441 and the third protruding wall 443 including the claws 400*b* function as a snap-fit mechanism for an operator to press and attach the circuit board 5 onto the base unit 400. The first protruding walls 441 and the third protruding wall 443 are examples of an elastic deforming part. The support faces 400*a* are an example of a support. The X direction or the Y direction (or the opposite direction thereof) is an example of a third direction. Further, the X direction or the Y direction is an example of a direction along a face 5*a* (or a face 5*b*) of the circuit board 5. The Z direction is an example of a fourth direction. The Z direction is an example of the thickness direction of the circuit board 5.

As described above, the first protruding walls 441 include the ends 441*a*, the protrusions 441*b*, and the claws 400*b*. That is, the first protruding walls 441 function as a deformation suppressor of the elastic parts 451 and 452, a slider against the walls 2*c* and 2*d* of the case 2, and attachments for the circuit board 5. Thereby, the base unit 400 and the movable assembly 3 can be made more compact than those with different parts individually providing these functions.

Further, as described above, the second protruding walls 442 include the ends 442*a* and the elastic parts 453. That is, the second protruding walls 442 function as the deformation suppressor of the elastic part 452 and the elastic 451, and the support and the deformation suppressor of the elastic part 453. Thereby, the base unit 400 and the movable assembly 3 can be made more compact than those with different parts individually providing these functions.

Figure 6:
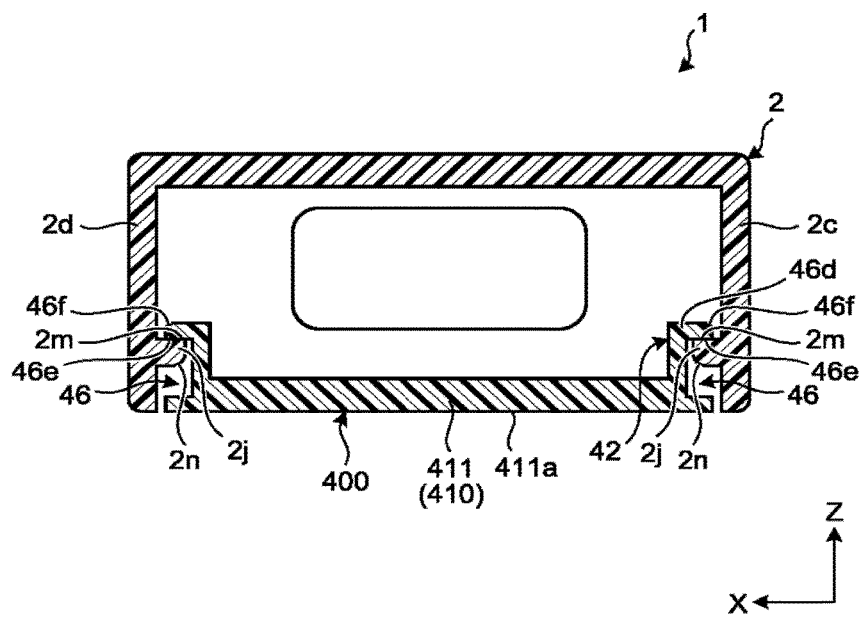
FIG. 6 is a VI-VI cross-sectional view of FIG. 1.

FIG. 6 is a VI-VI cross-sectional view of FIG. 1. FIG. 6 illustrates only the end faces of the case 2 and the base unit 400. As illustrated in FIG. 6, projections 2*j* are provided on the inner faces of the walls 2*c* and 2*d* of the case 2, protruding therefrom inward to the center of the care 2 in the X direction. The side walls 42 of the base unit 400 are provided with recesses 46 in the outer faces facing the walls 2*c* and 2*d*, the recesses oppositely depressed toward the center of the base unit 400 in the X direction. The projections 2*j* are accommodated in the recesses 46.

Further, as illustrated in FIG. 6, the projections 2*j* include contact faces 2*m* and inclined faces 2*n*. The contact faces 2*m* have a planar shape intersecting with the Z direction, to contact with side faces 46*e* of walls 46*d* of the recesses 46 in the X direction. The inclined faces 2*n* are opposite the contact faces 2*m* in the Z direction and inclined to be distant away from the walls 2*c* or 2*d* as distant away from the opening 2*g*. The inclined face 2*n* has a cylindrical (curved) shape. Further, the side faces 46*e* of the recesses 46 in the Z direction, that is, opposite the walls 46*d* in the Z direction have a planar shape intersecting with the Z direction. The walls 46*d* include inclined faces 46*f* opposite the side faces 46*e* in the Z direction. The inclined faces 46*f* are inclined to be closer to the walls 2*c* and 2*d* as closer to the bottom wall 410. The inclined faces 46*f* have a cylindrical (curved) shape. For inserting the movable assembly 3 into the case 2 through the opening 2*g*, the walls 46*d* are moved in the Z direction to surmount the projections 2*j*. In this case, owing to the inclined faces 46*f* of the walls 46*d* and the inclined faces 2*n* of the projections 2*j*, the movable assembly 3 can be more smoothly inserted into the case 2 than those with no inclined faces.

As illustrated in FIG. 5, each recess 46 is provided with a first groove 46*a*, a second groove 46*b*, and a third groove 46*c*. The first grooves 46*a* extend in the Y direction in the ends of the side walls 42 (base unit 400) in the opposite Z direction and in the opposite Y direction. The second grooves 46b extend in the Z direction from Y-directional ends of the first grooves 46a. The third grooves 46c extend in the Z direction from the opposite ends of the first grooves 46a in the Y direction.

Figure 7:
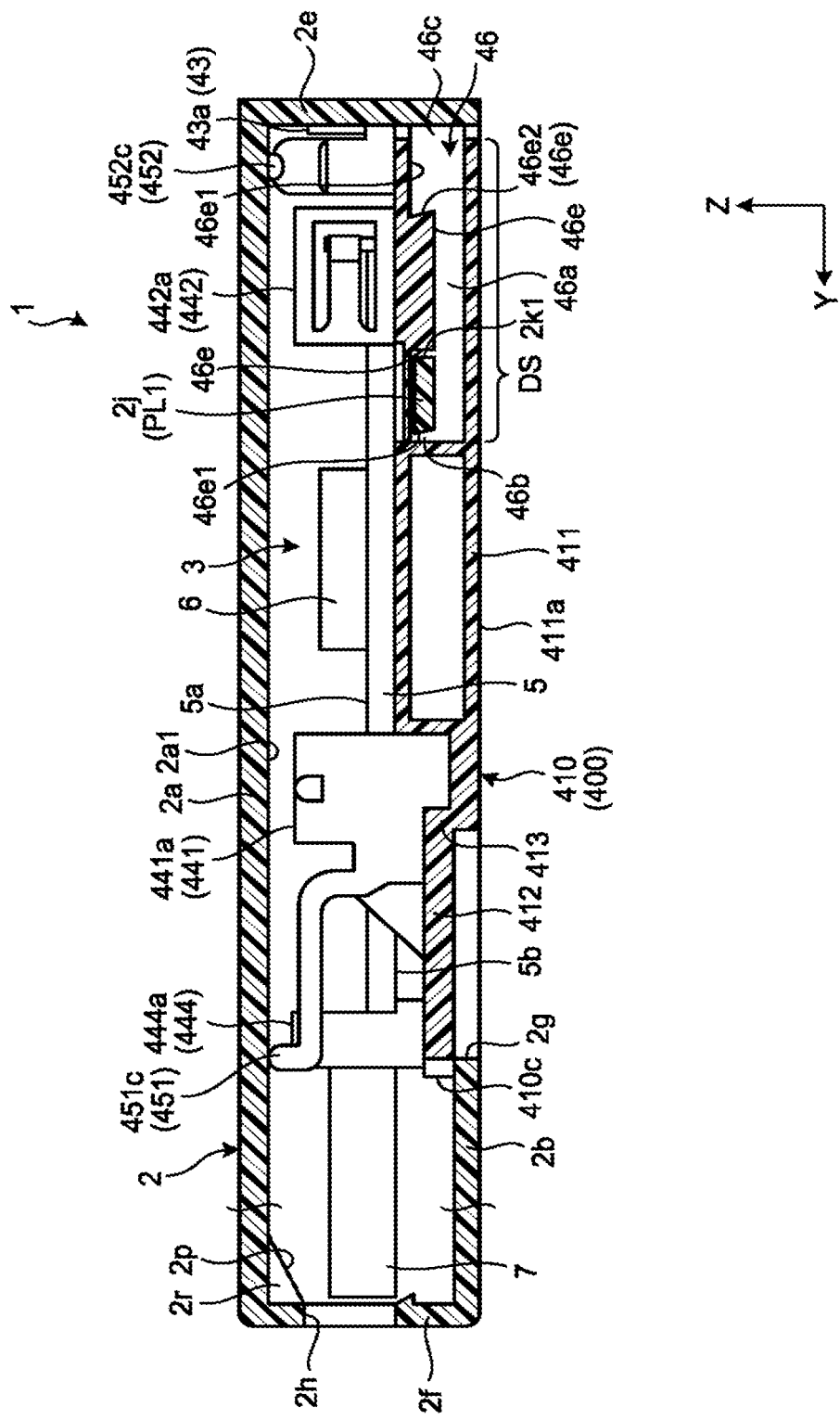
FIG. 7 is a VII-VII cross-sectional view of FIG. 1, illustrating that a slider is placed in a first holding position.
Figure 8:
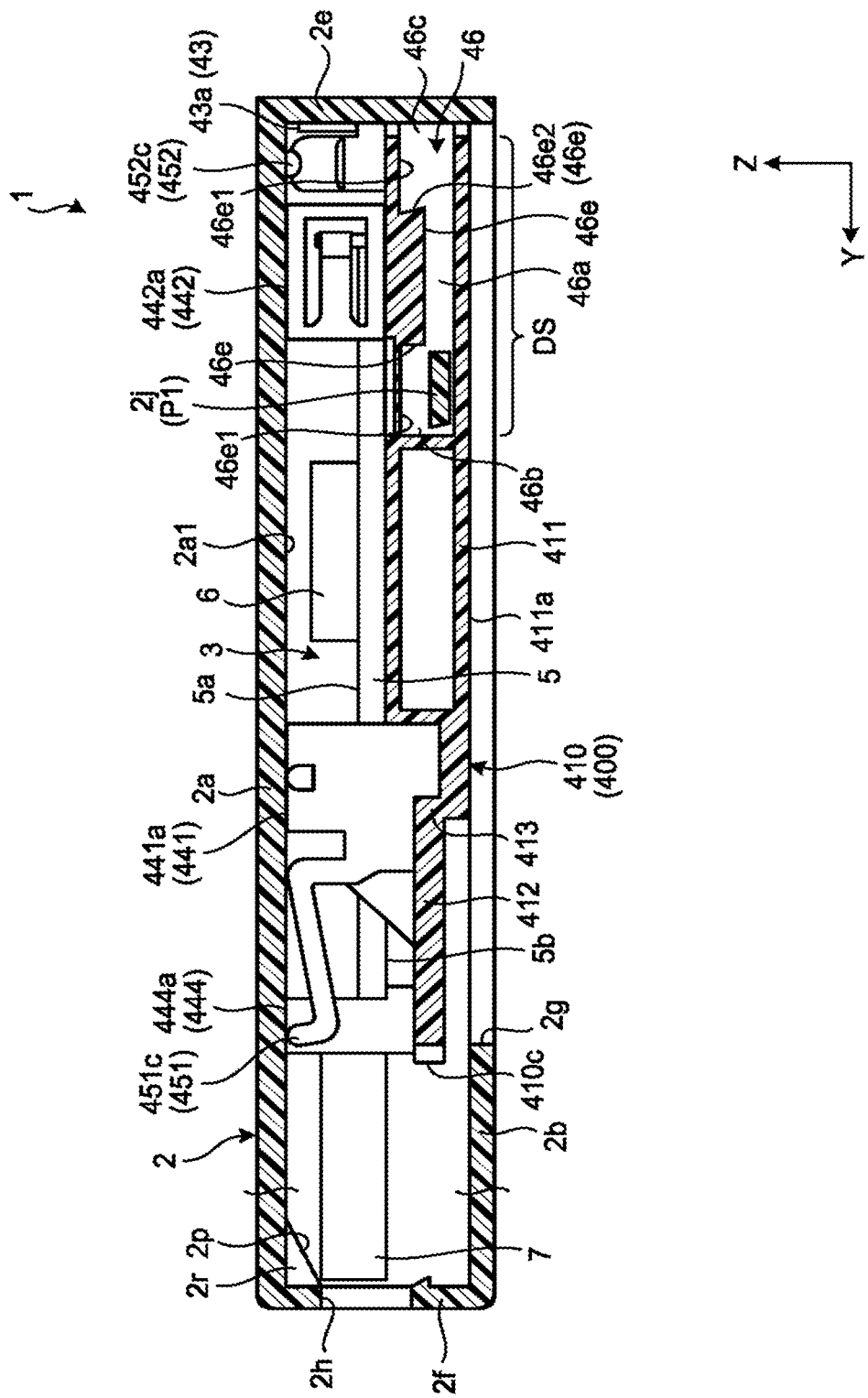
FIG. 8 is the VII-VII cross-sectional view of FIG. 1, illustrating that the slider is placed in a first position.
Figure 9:
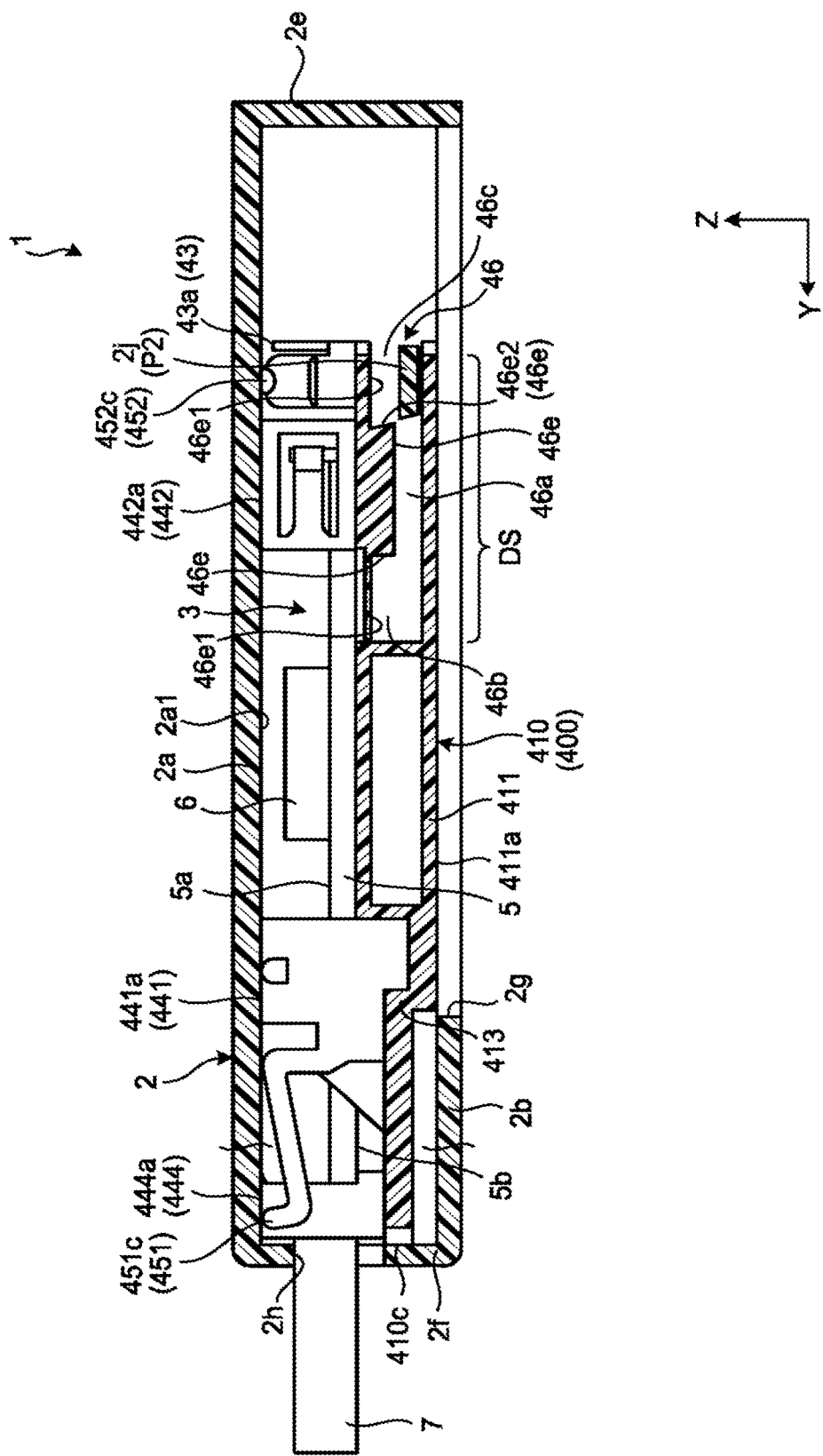
FIG. 9 is the VII-VII cross-sectional view of FIG. 1, illustrating that the slider is placed in a second position.
Figure 10:
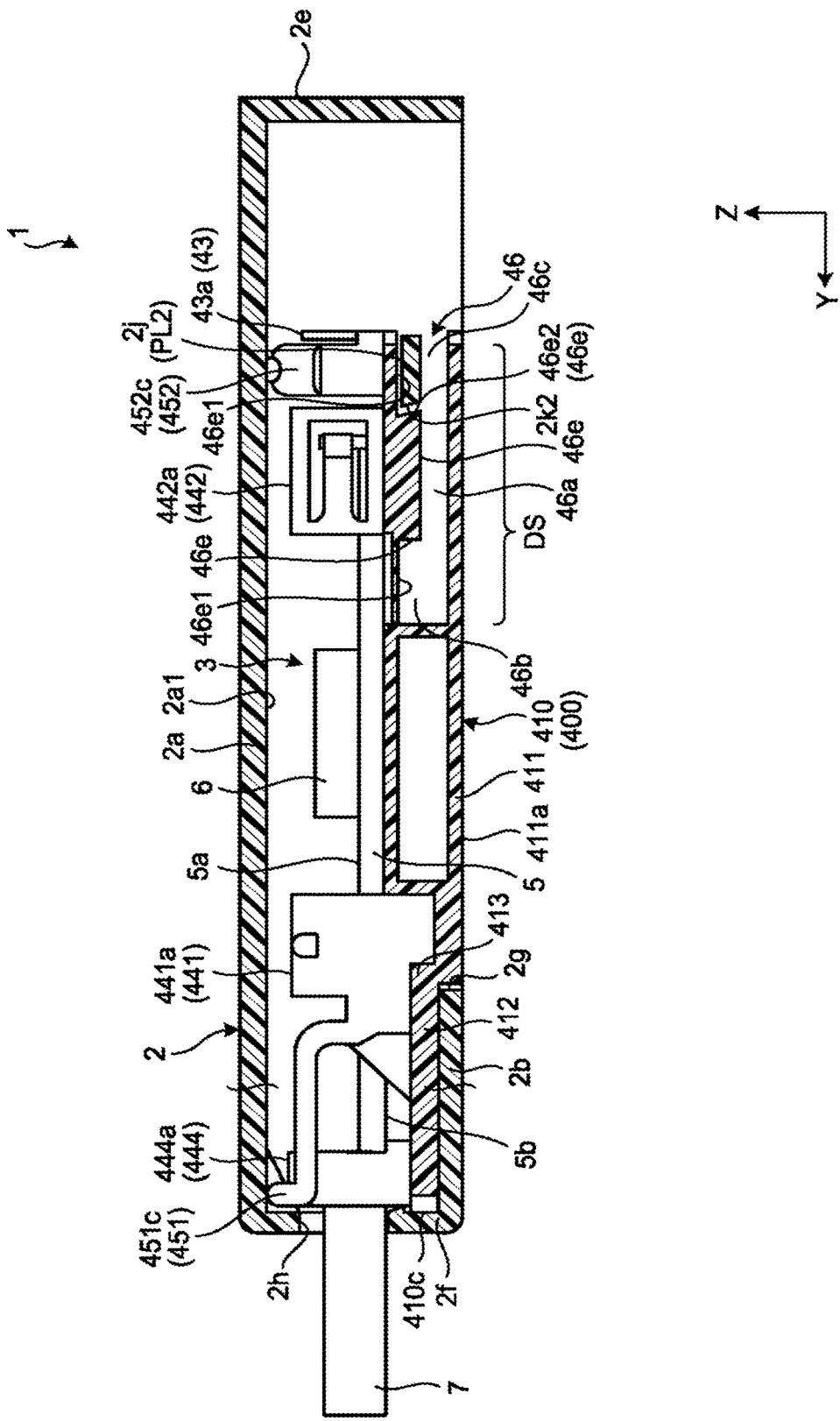
FIG. 10 is the VII-VII cross-sectional view of FIG. 1, illustrating that the slider is placed (used) in a second holding position.

FIGS. 7 to 10 are VII-VII cross-sectional views of FIG. 1, showing different relative positions between the case 2 and the movable assembly 3. FIG. 7 illustrates the housed state, and FIG. 10 illustrates the use state. The projection 2j of the case 2 can be moved along the first groove 46a, that is, in the Y direction. Further, the projection 2j can be moved along the second groove 46b and the third groove 46c, that is, in the Z direction. The position of the projection 2j at the Y-directional end of the first groove 46a illustrated in FIG. 8 is an example of a first position P1. The position of the projection 2j at the opposite end of the first groove 46a in the Y direction, illustrated in FIG. 9, is an example of a second position P2. The section between the first position P1 and the second position P2 of the projection 2j, that is, in which the projection 2j is moved along the first groove 46a, is an example of a slide section DS. The position of the projection 2j in the second groove 46b, most distant from the first groove 46a illustrated in FIG. 7, is an example of a first holding position PL1. The position of the projection 2j in the third groove 46c, most distant from the first groove 46a, illustrated in FIG. 10, is an example of a second holding position PL2. The projection 2j slides in contact with the side face 46e of the recess 46 and is thereby guided along the recess 46. As is clear from FIGS. 7 to 10, the elastic parts 451 and 452 are more largely bent as the movable assembly 3 moves farther in the Z direction. The projection 2j is an example of a slider. The side face 46e is an example of a guide that movably supports the projection 2j among the first holding position PL1, the slide section DS, and the second holding position PL2 that are separated from one another in the Y direction. The Z direction is an example of a first direction, and the opposite Y direction is an example of a second direction.

In the housed state of FIG. 7 and the use state of FIG. 10, the movable assembly 3 receives reaction force from the case 2 in the opposite Z direction, the reaction force being from the elastic force of the elastic parts 451 and 452 acting on the wall 2a of the case 2. Thereby, the projection 2j is urged by the elastic parts 451 and 452 relative to the grooves 46 in the Z direction. In the second groove 46b as illustrated in FIGS. 7 and 8, the projection 2j is moved toward the first holding position PL1 by the elastic force of the elastic parts 451 and 452, and is held in the first holding position PL1 in contact with a Z-directional side face 46e1 of the second groove 46b. Further, in the third groove 46c as illustrated in FIGS. 9 and 10, the projection 2j is moved toward the second holding position PL2 by the elastic force of the elastic parts 451 and 452, and is held in the second holding position PL2 in contact with the Z-directional side face 46e1 of the second groove 46b. In the states of FIGS. 7 and 10, even in the case where the movable assembly a receives force in the Y direction or in the opposite Y direction with respect to the case 2, relative Y-directional movement between the projection 2j and the base unit 400 is restricted by the contact between the Y-directional side face 46e of the second groove 46b or the third groove 46c, and the projection 2j, resulting in restricting the relative movement between the movable assembly 3 and the case 2 in the Y direction. Thus, the housed state of FIG. 7 and the use state of FIG. 10 are maintained. When in the housed state of FIG. 7 and the use state of the FIG. 10, an operator presses with his or her finger the bottom face 411a of the base unit 400 exposed from the opening 2g of the case 2 in the Z direction against the elastic force of the elastic parts 451 and 452, the projection 2j is moved from the first holding position PL1 or the second holding position PL2 to the slide section DS. Thus, the operator can switch the housed state and the use state by pressing the bottom face 411a in the Z direction and sliding it in the Y direction with his or her finger, for example. At this point, the projection 2j is moved between the first holding position PL1 and the second holding position PL2 through the first position P1, the slide section DS, and the second position P2. The first holding position PL1 is set to be away or offset from the first position P1 in the Z direction, and the second holding position PL2 is set to be away or offset from the second position P2 in the Z direction.

A side ace 2k2 of the projection 2j and a side face 46e2 of the recess 46 is inclined with respect to the Z direction, to be distant away from the first holding position PL1 as approaching from the second holding position PL2 to the second position P2. Thus, while relatively approaching (in Y direction) the first holding position PL1 with respect to the recess 46, the projection 2j receives force from the side face 46e2 of the recess 46 toward (in Z direction) the second holding position PL2. In this case, the projection 2j is hence moved from the second holding position PL2 to the second position P2, preventing the USB memory 1 from being released from the use state of FIG. 10. Note that not both but either of the side face 2k2 and the side face 46e2 with such inclination can attain similar effects. Further, at least one of the side face 46e of the recess 46 and a side face 2k1 of the projection 2j facing the side face 46e may have such inclination, which guides the projection 2j in the first holding position PL1 of FIG. 7 from the second holding position PL2 side. That is, the side faces 2k1 and 46e may be inclined with respect to the Z direction, to be distant away from the second holding position PL2 as approaching from the first holding position PL1 to the first position P1. In this case, while relatively approaching (in the opposite Y direction) the second holding position PL2 with respect to the recess 46, the projection 2j receives force from the side face 46e of the recess 46 toward (in the Z direction) the first holding position PL1. In this case, the projection 2j is thus moved from the first holding position PL1 to the first position P1, that is, the USB memory 1 is prevented from being released from the housed state of FIG. 7. The side face 2k2 (2k1) is an example of a first contact face, and the side face 46e2 (46e) is an example of a second contact face.

In the present embodiment, in the housed state of FIG. 7 and the use state of the FIG. 10, the wall 2b of the case 2 and the second part 412 of the base unit 400 are in contact and overlap each other in the Z direction. Thereby, the wall 2b of the case 2 can also receive, together with the projection 2j, the force of the elastic parts 451 and 452 from the base unit 400 in the opposite Z direction. This can reduce stress on the projection 2j and its periphery from when the projection 2j receives the elastic force of the elastic parts 451 and 452 alone, resulting in improving the reliability of the projection 2j and its periphery.

The USB memory 1 as the electronic component 6 includes a controller, a memory, and a buffer. The memory is, for example, a non-volatile rewritable memory such as NAND memory. The controller controls data write to the memory and data read from the memory. The buffer temporarily holds data to be written to the memory and data to be read from the memory. The connector 7 is mechanically connected with a connector of another electronic device. Data is transmitted between the controller and a controller of another electric device through wiring, a terminal of the connector 7, a terminal of the connector of another electric device, the terminal electrically connected with the terminal, and wiring in another electronic device. The circuit board 5 includes the face 5a and the opposite face 5b in the Z direction. The circuit board 5 is supported by the base unit 400 with a gap between the face 5b and the bottom wall 410. Thus, the electronic component 6 or other components can be mounted on the face 5b closer to the bottom wall 410. As an example, the connector 7 or the controller is provided on the face 5a of the circuit board 5, and the memory or the buffer is provided on the face 5b. The bottom wall 410 is an example of a wall.

Further, as illustrated in FIG. 7, the case 2 includes, between a Z-directional edge of the opening 2h and the inner face of the wall 2a, a rib 2r having an inclined face 2p inclined from the inner face of the wall 2a toward the opening 2h in the opposite Z direction as approaching the opening 2h in the Y direction. The inclined face 2p functions as a guide for the connector 7. Owing to the inclined face 2p, for example, the connector 7 can be prevented from being caught on the wall 2f (a periphery of the opening 2h) at the time of moving the movable assembly 3 to the use position or mounting the movable assembly 3 on the case 2.

As described above, in the present embodiment, the elastic parts 451 and 452 (first elastic parts) that can urge the protrusion 2j (slider) relative to the grooves 46 (guides) in the Z direction (first direction) are a part of the base unit 400 (movable member, second member). The base unit 100 can be thus simplified in structure and reduced in the number of components, for example, from that provided with springs and the like separately. The manufacturing labor and cost can be hence decreased, for example.

Further, in the present embodiment, the elastic parts 451 and 452 (first elastic parts) protrude from the bottom wall 410 (first wall), and contact with the case 2 (housing, first member) in the positions distant from the bottom wall 410. That is, the elastic parts 451 and 452 are configured to be elastically deformable between their ends and the bottom wall 410. This can, for example, elongate the elastic parts 451 and 452 and reduce the stress from their elastic deformation.

Further, in the present embodiment, the elastic parts 451 and 452 include the arms 451b and 452b (extensions) extending along the wall 2a (2c, 2d, and 2e) of the case 2 (housing). Thereby, the elastic parts 451 and 452 can be configured as plate springs in a cantilever shape bendable in the Z direction intersecting with the wall 2a. Further, the arrangement of other components can be facilitated without an interference with the elastic parts 451 and 452, in comparison with the elastic parts 451 and 452 positioned in the center of the case 2 or obliquely extending with respect to the wall 2a in the case 2. That is, the degree of freedom of the sizes and layout of the components in the case 2 can be increased.

Further, in the present embodiment, the bottom wall 410 includes the first protruding walls 441, the second protruding walls 442, and the fourth protruding walls 444 (protrusions) that inhibit excessive deformation of the elastic parts 451 and 452. This can improve the reliability of the elastic parts 451 and 452.

Further, in the present embodiment, the elastic part 453 (second elastic part) applies the elastic force to the wall 2c or 2d of the case 2 from inside in the X direction or the opposite X direction (third direction). In other words, the elastic part 453 urges the base unit 400 relative to the case 2 in the X direction or the opposite X direction. This can, for example, prevent the movable assembly 3 and the base unit 400 from moving in the case 2 in the X direction and issuing sounds or vibration. Shock resistance thereof can be also improved.

Further, in the present embodiment, the side face 46e2 (first contact face) of the recess 46 (guide), which guides the projection 2j (slider) in the second holding position PL2 from the first holding position PL1 side, or the side face 2k2 (second contact face) of the projection facing the side face 46e2, extends to be distant away from the first holding position PL1 as approaching the second position P2 from the second holding position PL2. Thus, while relatively approaching the first holding position PL1 with respect to the recess 46, the projection 2j receives the force from the side face 46e2 to move toward the second holding position PL2, which prevents the projection 2j from being deviated from the second holding position PL2.

Second Embodiment

Figure 11:
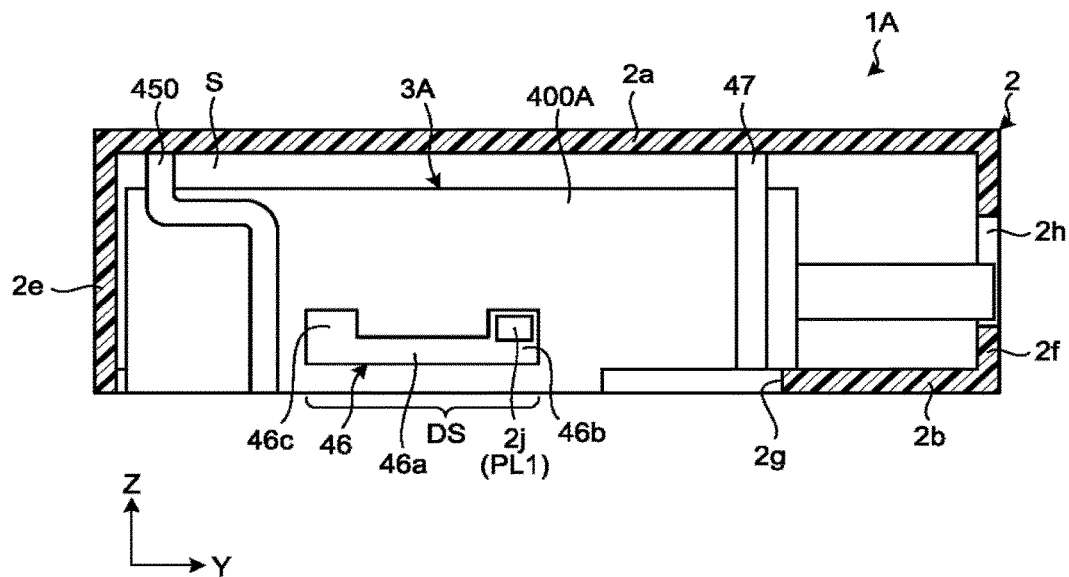
FIG. 11 is a schematic and exemplary cross-sectional view of an electronic device according to a second embodiment, illustrating that a slider is placed (housed) in a first holding position.
Figure 12:
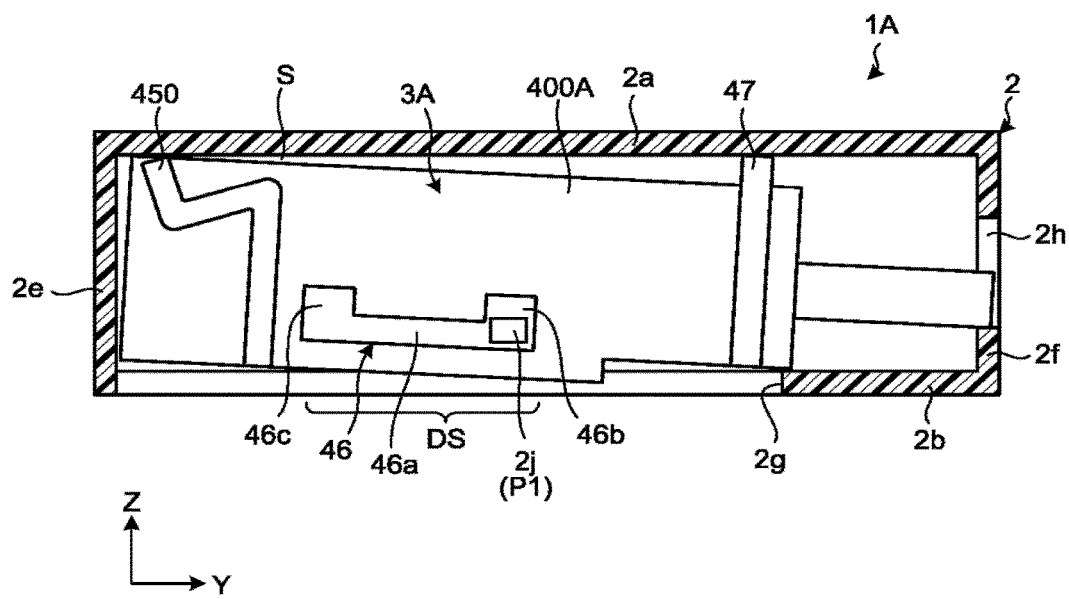
FIG. 12 is a schematic and exemplary cross-sectional view of the electronic device in the second embodiment, illustrating that the slider is placed in a first position.
Figure 13:
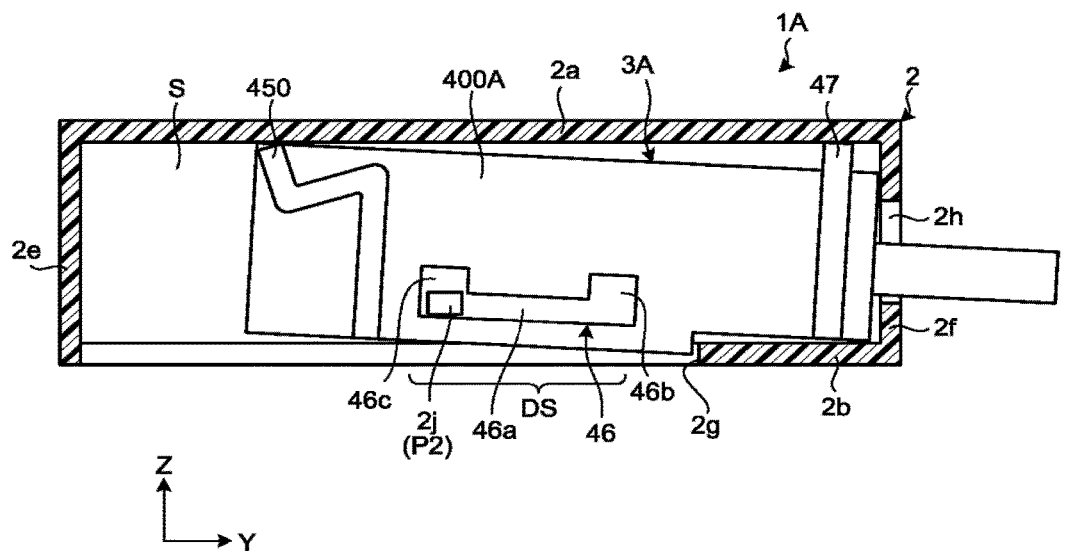
FIG. 13 is a schematic and exemplary cross-sectional view of the electronic device in the second embodiment, illustrating that the slider is placed in a second position.
Figure 14:
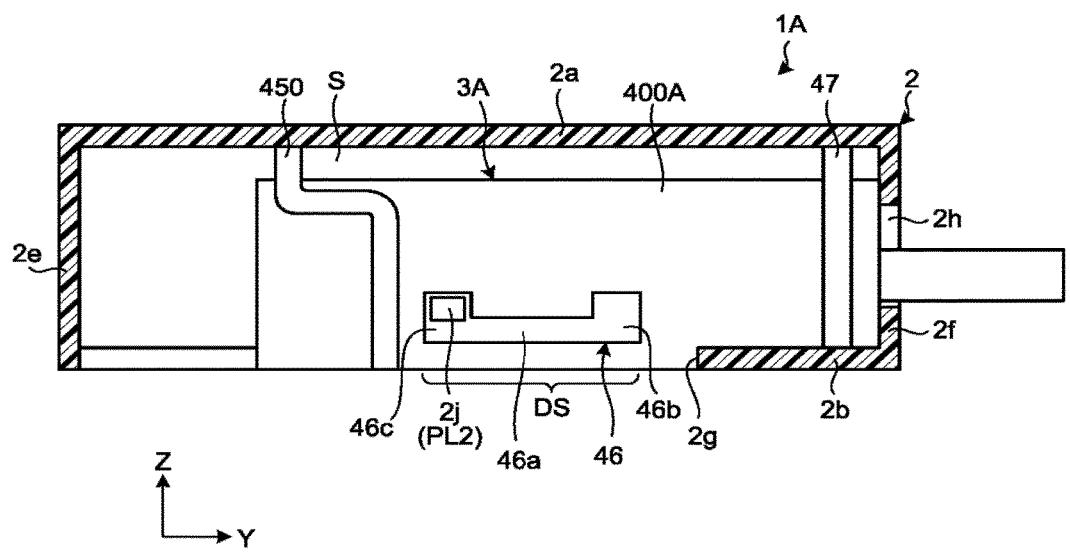
FIG. 14 is a schematic and exemplary cross-sectional view of the electronic device in the second embodiment, illustrating that the slider is placed (used) in a second holding position.

FIGS. 11 to 14 are cross-sectional views of a USB memory 1A of a second embodiment. FIG. 11 illustrates a movable assembly 3A when placed in a housed position. FIG. 12 illustrates the movable assembly 3A when released from the housed position in a case 2. FIG. 13 illustrates the movable assembly 3A before moved to a use position. FIG. 14 illustrates the movable assembly 3A held in the use position. The USB memory 1A of the present embodiment has a configuration similar to that in the first embodiment. Thus, the present embodiment can attain similar functions and result (effects) by the similar configuration.

However, in the present embodiment, the movable assembly 3A is rotated along a YZ plane in the case 2, to move the projection 2j from a first holding position PL1 to a first position P1. The movable assembly 3A includes a fixed contact 47 at a Y-directional end, protruding from a base unit 400A. The movable assembly 3A further includes, at the opposite Y-directional end, an elastic part 450 that can be elastically bent in a Z direction. A gap S is provided between the case 2 and the base unit 400A at the opposite Y-directional end. Thereby, by an operator's press to the movable assembly 3A with his or her finger in the Z direction through an opening 2g, the gap S between the case 2 and the base unit 400A is narrowed, rotating the movable assembly 3A about the contact 47 being a fulcrum as the opposite Y directional end of the movable assembly 3A is moved in the Z direction, that is, clockwise in FIG. 11. In this case, the projection 2j is moved from the first holding position PL1 illustrated in FIG. 11 to the first position P1 illustrated in FIG. 12 along with the relative rotation of the case 2 and the movable assembly 3A. When the movable assembly 3A is pressed in the Z direction and inclined, and moved in the Y direction, the projection 2j is moved to a second position P2 illustrated in FIG. 13. In this state, when released from the operator's press in the Z direction, the movable assembly 3A is rotated about the contact 47 as a fulcrum clockwise in FIG. 13 by the elastic force of the elastic part 450. In this case, the projection 2j is moved from the second position P2 illustrated in FIG. 13 to a second holding position PL2 illustrated in FIG. 14 along with the relative rotation of the case 2 and the movable assembly 3A. According to the present embodiment, the number of the elastic parts 450 can be decreased, which results in reducing manufacturing labor and cost.

Third Embodiment

Figure 15:
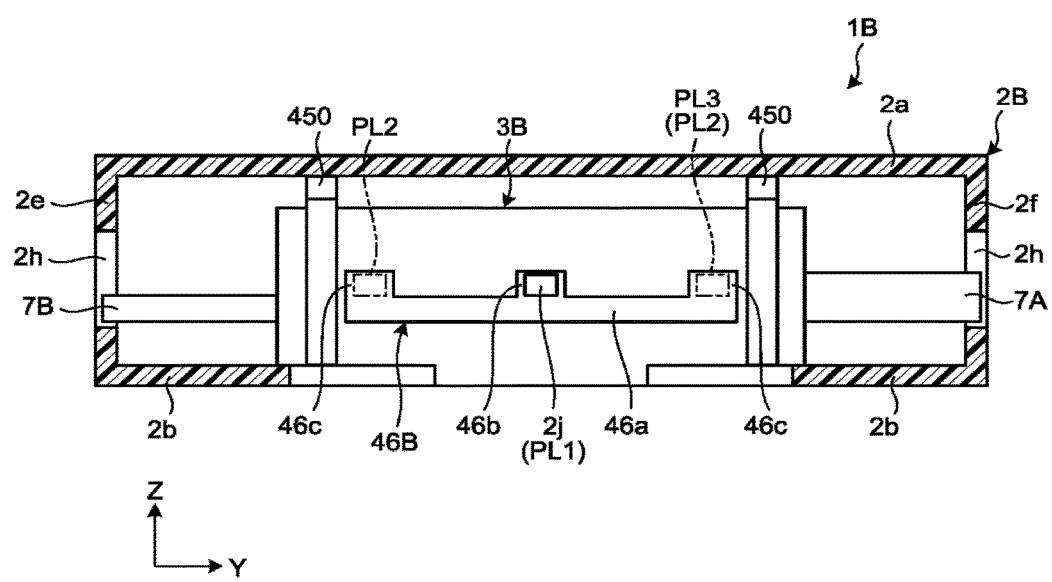
FIG. 15 is a schematic and exemplary cross-sectional view of an electronic device according to a third embodiment.

FIG. 15 is a cross-sectional view of a USB memory 1B of a third embodiment. The USB memory 1B of the present embodiment has a similar configuration to those of the first and second embodiments. Thus, the present embodiment can attain similar functions and results (effects) by the similar configuration.

However, in the present embodiment, a movable assembly 3B includes two connectors 7A and 7B having different specifications (including shapes, sizes, and types). The movable assembly 3B is movably supported in a case 2B among three positions, i.e., a first use position in which the connector 7A protrudes therefrom, a second use position in which the connector 7B protrudes therefrom, and a housed position in which both of the connectors 7A and 7B are housed. In view of this, a slide section DS and three holding positions PL1 to PL3 are set in a recess 46B. A slider 2j is provided in the case 2B. When the slider 2j is located in the first holding position PL1, the movable assembly 3B is located in the housed position with respect to the case 2B. When the slider 2j is located in the second holding position PL2, the movable assembly 3B is located in the first use position in which the connector 7A protrudes therefrom. When the slider 2j is located in the third holding position PL3, the movable assembly 3B is located in the second use position in which the connector 7B protrudes therefrom. The USB memory 1B of the present embodiment is adoptable to the two connectors 7A and 7B or two different types of connectors 7A and 7B. The third holding position PL3 is an example of a second holding position.

Further, the configurations and shapes in the embodiments can be partially replaced for implementation. The specification including the configurations and shapes (structure, type, direction, shape, size, length, width, thickness, height, angle, number, layout, position, material, and the like) can be appropriately changed for implementation.

For example, the slide structure in the movable assembly can be used in other electronic devices or devices other than the electronic devices. The connector may be socket or a pin, and the movable member may not include a part that protrudes in use as the connector. The specification of the elastic member can be changed in various manners. The guide may be provided in the housing (first member), and the slider may be provided in the movable member (second member).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A slide structure comprising:
a first member;
a second member being inside of the first member and movably supported by the first member;
a slider provided in one of the first member and the second member;
a guide provided in the other of the first member and the second member, the guide movably supporting the slider among a first holding position, a slide section, and a second holding position, the first holding position being away or offset from a first position in a first direction, the slide section extending between the first position and a second position distant from the first position in a second direction intersecting with the first direction, and the second holding position being away or offset from the second position in the first direction; and
a first elastic part being a part of the second member, the first elastic part which elastically deforms in accordance with a position of the second member relative to the first member, to be able to urge the slider in the first direction, wherein
the second member includes a first wall,
the first member includes a second wall that contacts with the first elastic part, and
the first elastic part protrudes from the first wall, and is elastically deformable between an end of the protruding first elastic part and the first wall while the second member is pressed into the first member and the first elastic part is pressed against the second wall.

2. The slide structure according to claim 1, wherein the first elastic part includes an extension extending along the second wall.

3. The slide structure according to claim 1, wherein the first member includes a third wall spaced apart from the second wall, the third wall being provided with an opening from which the first wall is exposed.

4. The slide structure according to claim 1, further comprising a protrusion that protrudes from the first wall, facing the first member in the first direction, and restricts an elastic deformation of the first elastic part.

5. The slide structure according to claim 1, further comprising a second elastic part being a part of the second member, the second elastic part which elastically deforms in accordance with the position of the second member relative to the first member to be able to urge the second member in a third direction intersecting with the first direction and the second direction.

6. The slide structure according to claim 1, wherein the guide includes a first contact face and the slider includes a second contact face facing the first contact face, the first contact face that guides the slider in the second holding position from the first holding position, the first contact face or the second contact face that extends further distantly from the first holding position while approaching the second position from the second holding position.

7. An electronic device comprising:
a housing;
a movable member that supports a circuit board on which an electronic component is mounted, the movable member being inside of the housing and movably supported by the housing;
a slider provided in one of the housing and the movable member;
a guide provided in the other of the housing and the movable member, the guide movably supporting the slider among a first holding position, a slide section, and a second holding position, the first holding position being away or offset from the first position in a first direction, the slide section extending between the first position and a second position distant from the first position in a second direction intersecting with the first direction, and the second holding position being away or offset from the second position in the first direction; and
a first elastic part being a part of the movable member, the first elastic part which elastically deforms in accordance with a position of the movable member relative to the housing to be able to urge the slider in the first direction, wherein the movable member includes a first wall, the housing includes a second wall that contacts with the first elastic part, and the first elastic part protrudes from the first wall, and is elastically deformable between an end of the protruding first elastic part and the first wall while the movable member is pressed into the housing and the end of the first elastic part is pressed against the second wall.

8. The electronic device according to claim 7, wherein the movable member includes an elastic deforming part and a claw, the elastic deforming part provided in a position deviated from the circuit board in a third direction along a face of the circuit board, the claw that protrudes from the elastic deforming part and overlaps with the circuit board in a fourth direction intersecting with the third direction, and the claw includes an inclined face that is inclined oppositely to a protruding direction of the claw as being distant away from the circuit board in the fourth direction.

9. The electronic device according to claim 7, wherein the movable member includes a support that supports the circuit board with a gap between the first wall and a face of the circuit board.

\* \* \* \* \*